(12) United States Patent
Kurosawa

(10) Patent No.: US 6,867,518 B2
(45) Date of Patent: Mar. 15, 2005

(54) SEALED MOTOR AND METHOD OF EMPLOYING SAME

(75) Inventor: Soichi Kurosawa, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 294 days.

(21) Appl. No.: 10/294,822

(22) Filed: Nov. 15, 2002

(65) Prior Publication Data

US 2004/0256932 A1 Dec. 23, 2004

(30) Foreign Application Priority Data

Nov. 16, 2001 (JP) .......................................... 2001-351564

(51) Int. Cl.[7] ........................ H02K 5/173; H02K 15/14; H02K 5/04
(52) U.S. Cl. .............................. 310/89; 310/90; 310/42
(58) Field of Search ................................ 310/42, 49 R, 310/89, 91

(56) References Cited

U.S. PATENT DOCUMENTS

| | | | | |
|---|---|---|---|---|
| 3,206,623 A | * | 9/1965 | Snowdon | 310/162 |
| 3,482,125 A | * | 12/1969 | Fleckenstein | 310/42 |
| 3,801,842 A | * | 4/1974 | Touchman | 310/49 R |
| 4,528,473 A | * | 7/1985 | Tezuka | 310/256 |
| 4,626,725 A | * | 12/1986 | Kawada et al. | 310/89 |
| 4,982,125 A | * | 1/1991 | Shirakawa | 310/88 |
| 5,315,200 A | * | 5/1994 | Lemieux et al. | 310/258 |
| 5,334,897 A | * | 8/1994 | Ineson et al. | 310/89 |
| 5,723,926 A | * | 3/1998 | Obara et al. | 310/89 |
| 5,945,759 A | * | 8/1999 | Tanaka et al. | 310/90 |
| 6,040,647 A | * | 3/2000 | Brown et al. | 310/89 |
| 6,211,587 B1 | * | 4/2001 | Enomoto et al. | 310/52 |
| 6,225,715 B1 | * | 5/2001 | Hoda et al. | 310/67 R |

FOREIGN PATENT DOCUMENTS

| | | |
|---|---|---|
| JP | U 1-61854 | 4/1989 |
| JP | A 1-286749 | 11/1989 |
| JP | B2 3-24142 | 4/1991 |
| JP | A 4-49828 | 2/1992 |
| JP | A 4-372546 | 12/1992 |
| JP | A 8-298739 | 11/1996 |

* cited by examiner

Primary Examiner—Burton Mullins
(74) Attorney, Agent, or Firm—Oliff & Berridge, PLC

(57) ABSTRACT

A motor has a sealed structure, in which a stator core is disposed outside rotors attached to a rotating shaft held by bearings. The motor is equipped with bushes for fixing the bearings, a housing having a through hole from which one end of the rotating shaft protrudes, and pushing spring shims disposed inside the housing for pushing the bush in the longitudinal direction of the rotating shaft. The housing includes a plate portion and a sealing case formed in the shape of a hollow cylinder with a bottom. The bushes have cutout portions formed for positioning the stator core and the rotors in the direction perpendicular to the rotating shaft and for positioning the rotors in the longitudinal direction of the rotating shaft, and the plate portion and the sealing case constituting the housing are sealed by a sealing material.

9 Claims, 6 Drawing Sheets

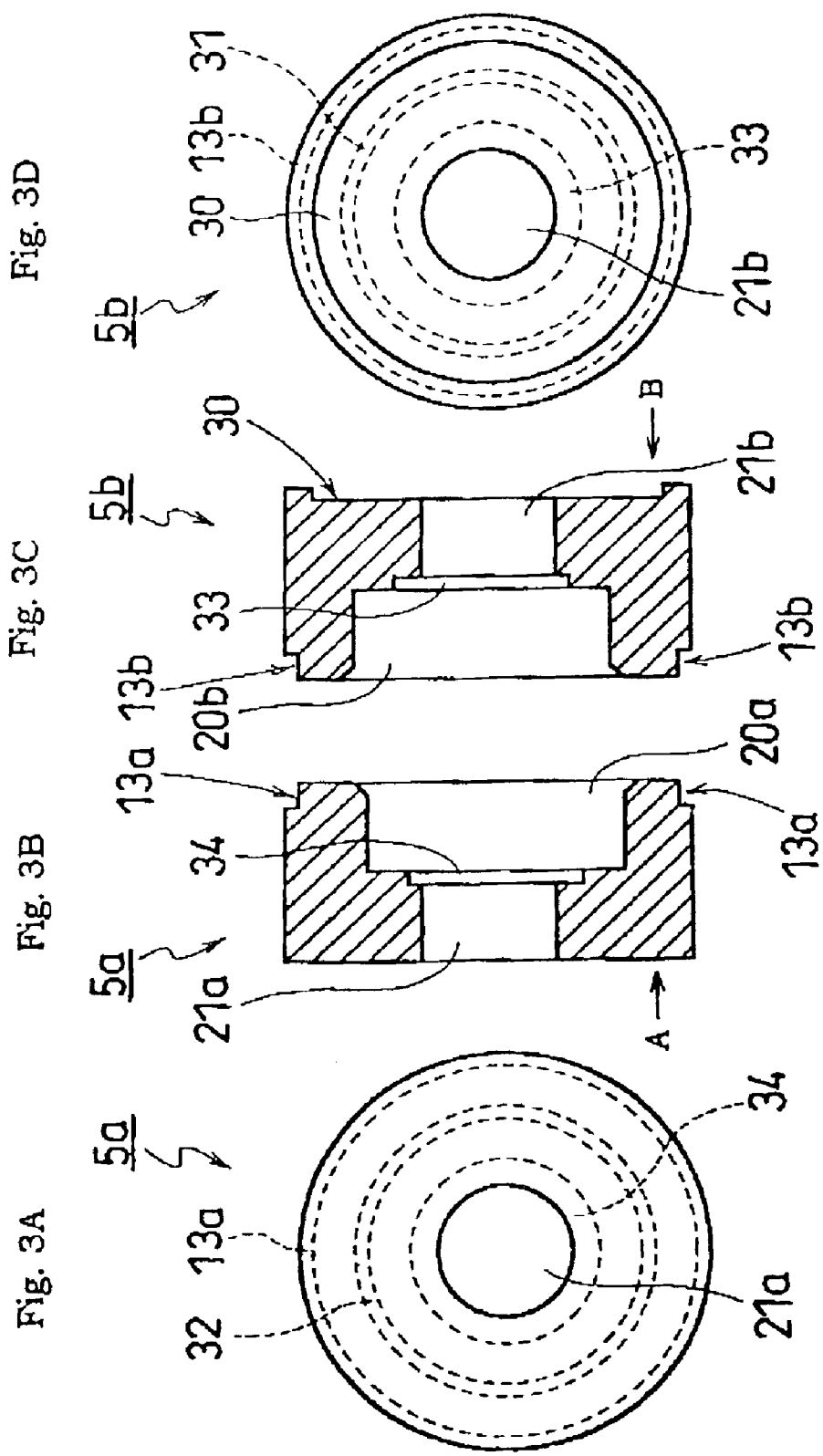

SEALED MOTOR AND METHOD OF EMPLOYING SAME

BACKGROUND OF THE INVENTION

1. Field of the Invention

The present invention relates to a sealed motor, and more particularly, to the motor of which the housing is contrived for easy and reliable positioning of rotors and a stator core.

2. Description of the Related Art

Hitherto, motors which are installed in vehicles are demanded to be small, precise, and durable in harsh environments. Accordingly, a small and precise stepping motor with a sealed-structure is employed for adverse environments such as a dusty or a moist environment. This type of stepping motor typically has a structure in which a stator core is disposed outside rotors which are attached to a rotating shaft, and the front portion and the back portion of the rotating shaft are held by bearings which are attached to bushes disposed at the front and the back of the stator core, respectively. In this conventional structure, the bushes have been generally made of aluminum alloy by die sting or cutting. In the structure, rotors are attached to the circumference of a rotating shaft. Outside the rotors, the stator core, which is wound with a stator coil, is spaced at a very small predetermined interval.

Each of the bushes is joined with the front portion and the back portion of the stator core. The bushes are made of aluminum alloy by die casting or by cutting with high precision such that the outer end portion of each of the bushes firmly contacts the entire circumferential surface of the stator core, and the bushes sandwich the stator core with bolts. Each of the bushes has an inner circumferential portion inside of the outer circumference. Each of the beatings is supported by the inner circumferential portion and an annular portion, which faces inward, of each of the bushes. The rotating shaft is supported by each of the bearings so as to rotate freely. Furthermore, a sealed-structure is adopted for covering the entire stepping motor by a housing in order to prevent moisture penetrated into the bearings from the joint surface of the stator core and the opening portion of the bush.

In the stepping motor described above, the end portion of the outer circumferential portion of each of the bushes firmly contacts the entire surface of the stator core in order to prevent dust entering the bush while keeping the right position of the bearing. Since the bushes need to be formed at a high accuracy, and a sealed structure should prevent moisture to be penetrated, improvements with regard to a high production yield, decreasing of parts number and a manufacturing cost are demanded.

In a conventional stepping motor, there has been a stepping motor disclosed in Japanese Unexamined Patent Publication No. 4-372546. Here, a black anodic oxide film (alumite) is applied to a bracket (above-described conventional bush) to suppress the increase in temperature, thereby efficiently improving the rated capacity. In other examples disclosed in Japanese Examined Patent Publication No. 3-24142, Japanese Unexamined Patent Publication Nos. 1-286749 and 4-49828, and Japanese Unexamined Utility Model Publication No. 1-61854, a bracket is formed from synthetic resin, thus there are problems in accuracy, cost, and environmental durability.

For solving the above problems, there is, for example, a stepping motor disclosed in Japanese Unexamined Patent Publication No. 8-298739. This invention aims to provide a stepping motor which can be fabricated without using die-casting or cutting of an aluminum alloy by using a metal with a high yield.

In a stepping motor disclosed in Japanese Unexamined Patent Publication No. 8-298739, a stator core is disposed outside rotors which are attached to a rotating shaft, and the front portion and the back portion of the rotating shaft are held by bearings which are attached to the bushes disposed at the front and the back of the stator core, and the bush is formed of a metal plate by a press working. The portion of the bush contacting the stator core is formed so as to have a small thickness, and the portion of the outer circumference of the stator core is held by the portion having the small thickness. At the same time, the portion to which the bearing is attached has a structure in which a folding portion for holding the outer circumference of the bearing and the sticking portion for holding the outside of the bearing are arranged interchangeably.

With this arrangement, a portion of the outer circumference of the stator core is held by the portion of the bush having the small thickness formed at the portion contacting the stator core, thus a bush formed with less accuracy can firmly contact the stator core.

FIGS. 6 and 7 are sectional views of stepping motors disclosed in the above Japanese Unexamined Patent Publication No. 8-298739. In FIGS. 6 and 7, bushes 5a and 5b are formed of a metal plate by press working. The portions of the outer circumferences of the bushes, which contact a stator core 3, have a small thickness, and these portions having a small thickness (thin portions) 13c and 13d hold a portion of the outer circumference of the stator core 3. At the same time, the portions of the bushes 5a and 5b, to which bearings 7a and 7b are attached, have structures in which folding portions 21a and 21b for holding the outer circumferences of the bearings 7a and 7b and sticking portions 50a and 50b for holding the outside of the bearings 7a and 7b are arranged interchangeably.

The bushes 5a and 5b have substantially rectangular shapes of which corners are formed in a slantwise manner. The four corner portions have holes (not shown). These holes are used for leading bolts (not shown) which connect the whole structure by passing through the bushes 5a and 5b and the stator core 3.

The difference between FIG. 6 and FIG. 7 is as follows. As shown in FIG. 6, in a structure in which the stator core 3 is sandwiched between the bushes 5a and 5b, a portion of the outer circumference of the stator core 3 is held by the thin portions 13c and 13d, and the bushes 5a and 5b are tightened with bolts. In the following, the structure in which a portion of the outer circumference of the stator core is held by the bushes is called an "outer-case" type.

As shown in FIG. 7, in a structure in which the stator core 3 is sandwiched between the bushes 5a and 5b, a portion of the inner circumference of the stator core 3 is held by the thin portions 13a and 13b, and the bushes 5a and 5b are tightened with bolts. In the following, the structure in which a portion of the inner circumference of the stator core is held by the bushes is called an "inner-case" type.

In the stepping motors shown in FIGS. 6 and 7, the bushes conventionally made of aluminum alloy by die casting or by cutting can be formed by press working, and the junction portion with the stator core and attachment portion of the bearing are changed.

In the above invention, a portion of the outer circumference (FIG. 6) or the inner circumference (FIG. 7) of the stator core is held by the thin portions 13a and 13b (13c and 13d) which are formed at the portion contacting the stator core.

However, when installing the stepping motor into a vehicle, the following problem can be found. A portion of the outer circumference or inner circumference of the stator core 3 is held by the thin portions 13a and 13b (13c and 13d) formed at the portion contacting the stator core. Perpendicularly to a rotating shaft 6, the space between the stator core 3 and rotors 11a and 11b can be of a high precision by accurately forming the bushes 5a and 5b, and the stator core 3. However, in the direction along the rotating shaft 6, it is difficult to achieve a high precision since spacers 15 and 16, and the bearings 7a and 7b are interposed between the bushes 5a and 5b, so that many factors such as the forming accuracy, the assembly tolerance, and the wearing of the spacers 15 and 16, and the bearings 7a and 7b as a result of rotation are affected.

Also, the stator core 3 functions as a part of the sealed motor. However, the stator core 3 is formed by laminated silicon steel plates in general, and paint is applied on the surface of the steel plates for the prevention of corrosion, and is laminate fixed by varnish and so on. Accordingly, the surface has concavities and convexities, thus, it is difficult to prevent penetration of moisture. Further, the bushes 5a and 5b are tightened by bolts, which also makes it difficult to prevent the penetration of moisture, thus the motor is not suitable for using in an adverse environment, such as for a vehicle described above. Moreover, it requires a housing to cover the entire stepping rotor in order to prevent moisture from penetration to the bearings from the contacting faces of the stator core, and the opening portion of the bushes.

SUMMARY OF THE INVENTION

The present invention is made to solve the above-described problem, and an object is to provide a sealed motor to be installed in a vehicle for use in an adverse environment.

In order to achieve the above object, the following mechanisms are contrived the present invention. For improving the dimensional precision in the longitudinal direction to the rotating shaft and in the direction perpendicular to the rotating shaft of a stator core and rotors, a widely-known outer-case type or inner-case type is adopted for the structure of the motor in which the portion of the stator core is held by the bushes. Also, the motor thus constructed is contained in a sealing case, so that a sealed motor which protects against dust and moisture is created. Furthermore, the sealing case is composed of a plate portion and sealing case which is formed as a hollow cylinder with a bottom, and the bush is pushed by a pre-load means provided inside the sealing case in order to improve the dimensional precision in the direction of the rotating shaft of the stator core and the rotors.

More specifically, according to a first aspect of the present invention, there is provided a sealed motor, in which a stator core is disposed outside rotors attached to a rotating shaft and the rotating shaft is held by bearings attached to the rotating shaft, the motor including: bushes for fixing the bearings; a housing having a through hole from which one end of the rotating shaft protrudes as an output shaft; and preload means disposed inside the housing for pushing the bush in the longitudinal direction of the rotating shaft, wherein Fe housing comprises a plate portion and a sealing case which is formed in the shape of a hollow cylinder with a bottom, the output shaft outputs from a through hole which is formed on the plate portion, the bushes have cutout portions formed for positioning the stator core and the rotors in the direction perpendicular to the rotating shaft and for positioning the rotors in the longitudinal direction of the rotating shaft, and the plate portion and the sealing case constituting the housing are sealed by a sealing material.

With this arrangement, it is possible to provide a sealed motor which protects from dust and moisture, and is installed into a vehicle for use in an adverse environment. Furthermore, the enclosed case is composed of a plate portion and a ing case which is formed as a hollow cylinder with a bottom, and sealed by bonding, welding, and so on, thus it is possible to provide a motor which can prevent moisture from coming in because no bolts are used, it is easy to be assembled, and of high precision. In this regard, the plate portion may be a case formed as a hollow cylinder with a bottom. Moreover, by adopting an inner-case type, in which the bushes of both sides hold the portion of the inner circumference of the stator core, a simple-structured motor can be formed easily, thus the motor can be applied to a non-sealed structure case.

In the first aspect of the present invention, the pre-load means is preferably disposed at the bush which is disposed at the opposite side of the output shaft of the rotating shaft, and the pushing is preferably performed in the longitudinal direction of the rotating shaft. With this arrangement, it is possible to eliminate the restrictions on the design of the assembly materials.

Also, in the first aspect of the present invention, the pre-load means is preferably disposed between the bush and the housing, and between the bearing and the bush. With this arrangement, it is possible to ensure positioning in the longitudinal direction of the rotating shaft.

Furthermore, in the first aspect of the present invention, the pre-load means is preferably springs which are disposed between the bush and the housing, and between the beating and the bush. With this arrangement, it is possible to lower the cost using a pre-load means of a simple structure.

Moreover, in the first aspect of the present invention, an air gap preferably exists between the housing and the stator core. With this arrangement, it is possible to ensure positioning in the direction perpendicular to the rotating shaft. Also, the air gap has a noise-reducing effect by preventing resonance caused by the propagation of electromagnetic vibrations to the ing case, which ours at the stator core when an electric current is flowed to the stator coil for excitation.

According to a second aspect of the present invention, there is provided a method of employing a sealed motor in which a stator core is disposed outside rotors attached to a rotating shaft and the rotating shaft is held by bearings attached to the rotating shaft, the motor including bushes for fixing the bearings and a housing having a plate portion and a sealing case formed in the shape of a hollow cylinder with a bottom, an output shaft outputting from a through hole formed on the plate portion, the bushes having cutout portions formed for positioning the stator core and the rotors in the direction perpendicular to the rotating shaft and for positioning the rotors in the longitudinal direction of the rotating shaft, and pre-load means being disposed inside the housing for pushing the bush in the longitudinal direction of the rotating shaft, the method including the steps of: building the motor in the housing; sealing the plate portion and the sealing case by a sealing material; and sealing the through hole formed on the plate portion by contacting firmly with a build-up material for which the motor is used. With this arrangement, it is possible to prevent the penetration of dust and moisture even though the through hole formed on the plate portion does not have a particular sealed structure, thus an apparatus for which the motor is employed can be assembled easily.

BRIEF DESCRIPTION OF THE DRAWINGS

FIG. 1A is an entire view, FIG. 1C illustrates an enlarged view of the magnetized state of the rotors 11a and 11b.

FIGS. 3A, 3B, 3C, and 3D illustrate the structures of bushes. FIG. 3A is a view of a bush 5a taken in the direction of A in FIG. 3B, FIG. 3B is a cross-sectional view of the bush 5a, FIG. 3C a cross-sectional view of a bush 5b, and FIG. 3D is a view of the bush 5b taken in the direction of B in FIG. 3C.

FIG. 4A illustrates assembling of a bush and rotors, FIG. 4B illustrates assembling of the portion which was assembled in the above FIG. 4A and a stator core, and FIG. 4C illustrates assembling of the portion which was assembled in the above FIG. 4B and another bush.

DESCRIPTION OF THE PREFERRED EMBODIMENTS

Figure 6:
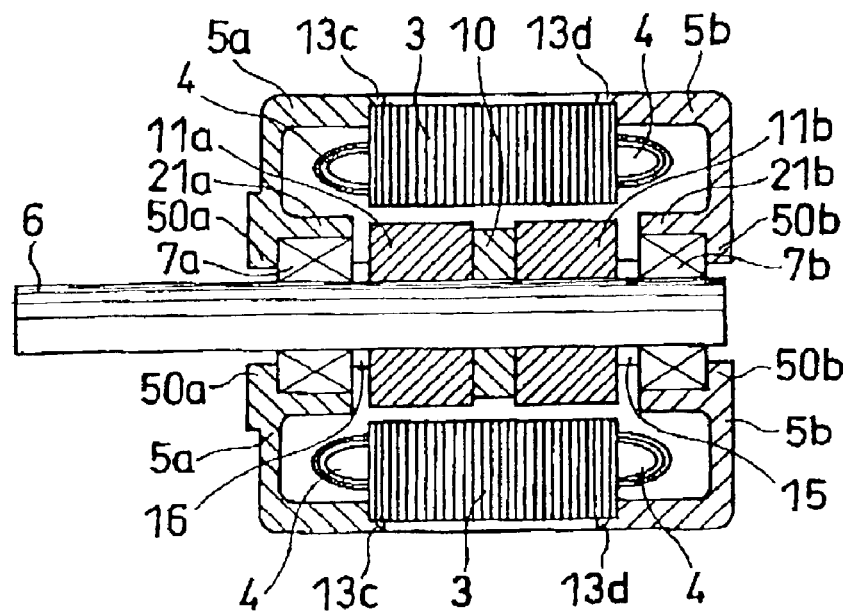
FIG. 6 is a cross-sectional view of a conventional stepping motor illustrating an outer-case type embodiment.
Figure 7:
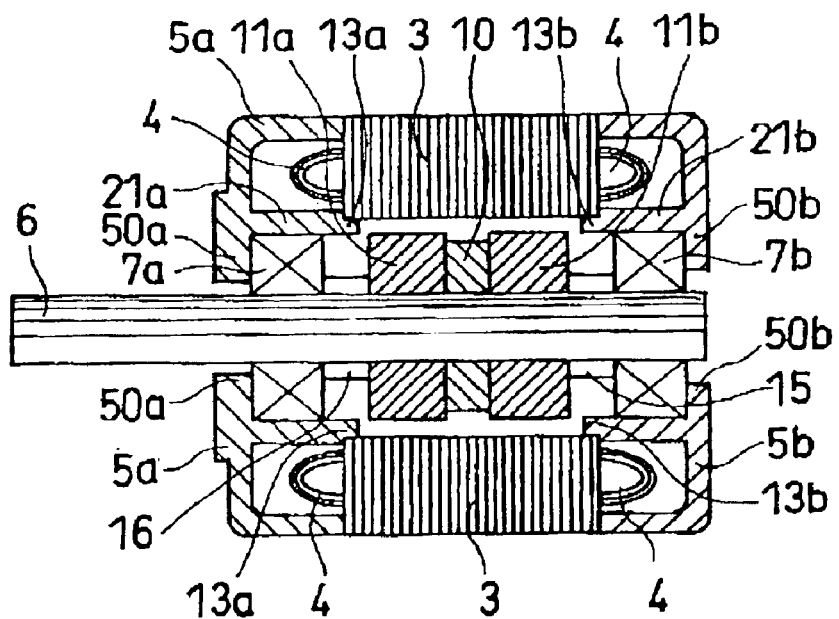
FIG. 7 is a cross-sectional view of a conventional stepping motor illustrating an inner-case type embodiment.

In the following, an embodiment of the present invention will now be described as a stepping motor with reference to the drawings. The same reference numerals are applied to the same portions which are described in FIG. 6 and 7, and their descriptions are omitted. Also, the present invention can be applied to a motor other than a stepping motor without departing from the spirit and the scope of the invention.

Figure 1A:
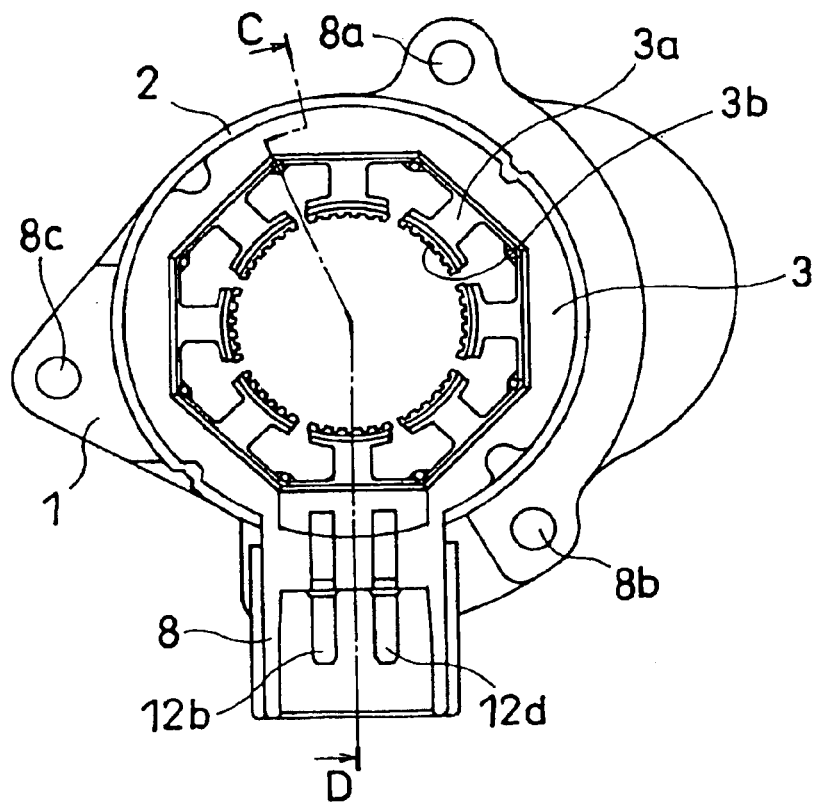
FIGS. 1A and 1C are front views taken on line A-B of FIG. 2 illustrating front views of a stepping motor according to an inner-case type embodiment of the present invention.
Figure 1B:
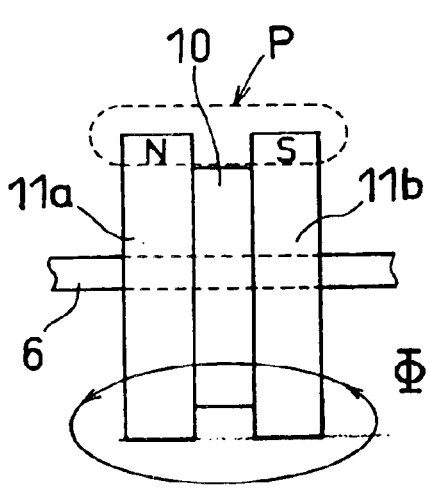
FIG. 1B illustrates the magnetized state of rotors 11a and 11b by the magnetic flux of a magnet 10.
Figure 1C:
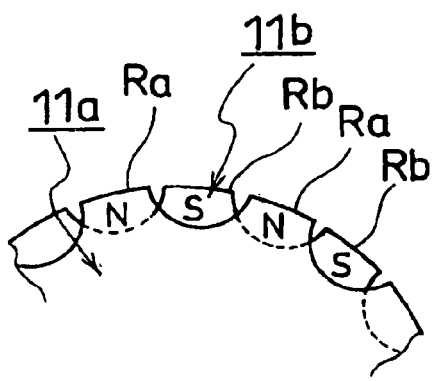
Figure 2:
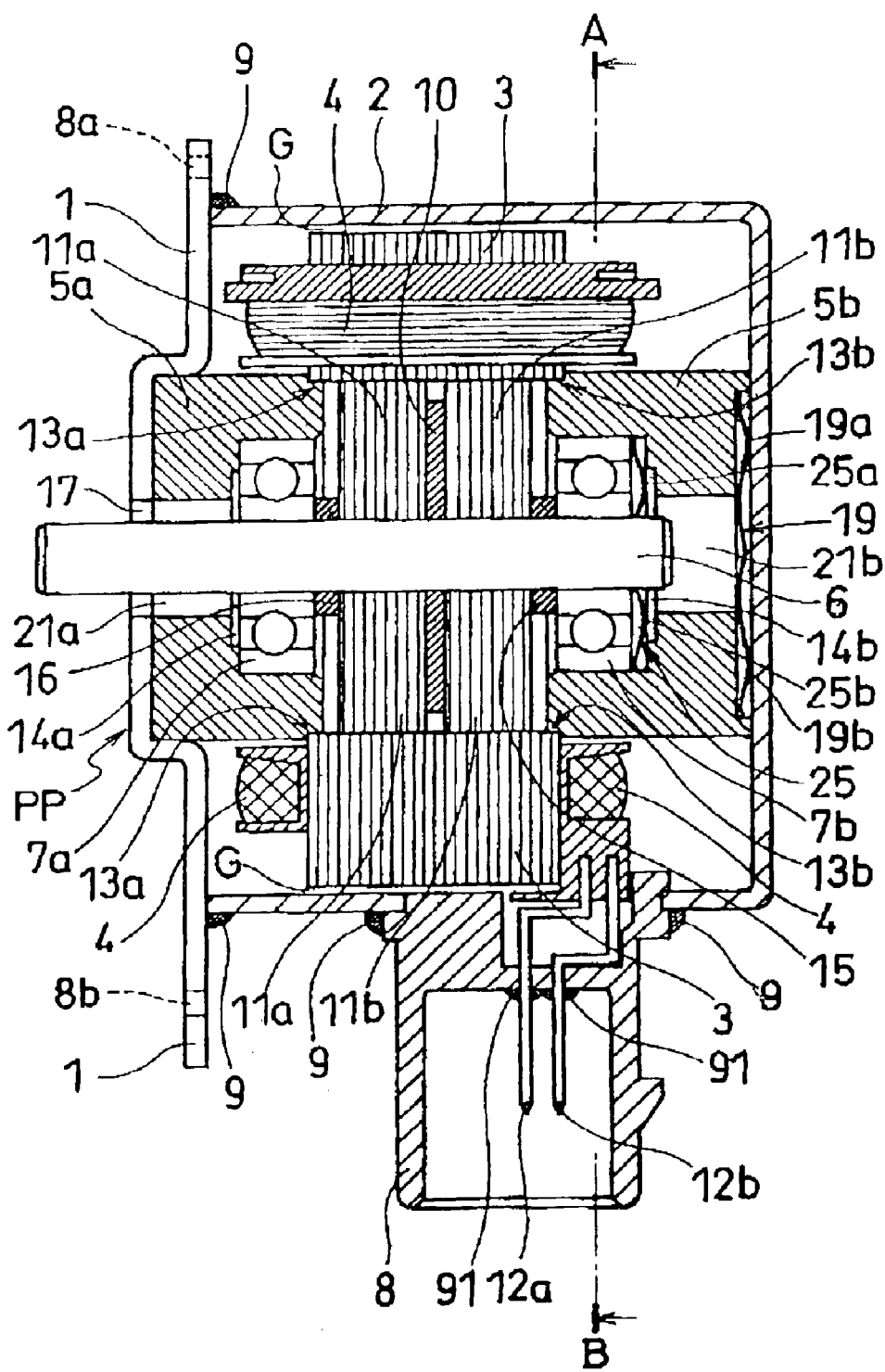
FIG. 2 is a cross-sectional view taken on line C-D of FIG. 1 of an inner-case type embodiment according to the present invention.

FIGS. 1A and 1C are front views taken on line A-B of FIG. 2 illustrating front views of a stepping motor according to an embodiment of the present invention. FIG. 1A is an entire view, FIG. 1B illustrates the magnetized state of rotors 11a and 11b by the magnetic flux of a magnet 10, and FIG. 1C illustrates an enlarged view of the magnetized state of the rotors 11a and 11b.

In FIG. 1A, a stator core 3 evenly contains a plurality of magnetic poles 3a which has a plurality of magnetic pole teeth 3b, respectively, and opposes the rotor which is located at the inside and is not shown in the figure. In such stepping motors, given that the rotor has a diameter of about 25 mmΦ, the deviation from the circularity of the stator core is 2 $\mu$m, the gap distance between the magnetic pole teeth 3b and the rotor is from 40 to 50 $\mu$m, thus high precision is required for the fabrication and assembly of the rotor and the stator core 3.

Surrounding the stator core 3, a sealing case 2, which is formed as a hollow cylinder with a bottom, is disposed as described below, and a plate portion 1 and the sealing case 2 constitute an enclosed-structure housing.

On the plate portion 1, through holes 8a, 8b, and 8c for fixing the stepping motor to an apparatus are disposed individually. Also, terminals (only 12b and 12d are illustrated) to which a plurality of stator winding wires, which winds around the stator core 3 although not shown in the figure, lead out via a connector 8 which is disposed on the side face of the ing case 2.

In FIG. 1B, the magnet 10 is disposed between the rotors 11a and 11b which are attached to a rotating shaft 6, thus magnetic flux (of the magnet 10 passes through the rotors 11a and 11b. As shown in FIG. 1C, a plurality of magnetic poles Ra and Rb arm arranged individually along the circumferences of the rotors 11a and 11b. The magnetic poles Ra and Rb are arranged such that they are shifted by one magnetic pole with each other, and the magnetic flux Φ of the magnet 10 passes through the magnetic poles, thus an N-pole and an S-pole are formed with each other.

FIG. 2 is a cross-sectional view taken on line C-D of FIG. 1. In the following, a description will be given with reference to FIG. 2. FIG. 2 illustrates an embodiment of a stepping motor of an inner-case type. The portions of bushes 5a and 5b, on which side the stator core 3 faces the rotors 11a and 11b, and which contacts the stator core 3, has cutout portions 13a and 13b formed individually for holding a portion of the inner circumference of the stator core 3. The bushes 5a and 5b are made of nonmagnetic material and formed by, for example, aluminum die-casting, powder metallurgy, resin molding and so on, in consideration of magnetic path formation, productivity, and cost. When the bushes 5a and 5b are formed by resin molding, it has an effect to attenuate solid borne noise which is propagated from bearings, thereby reducing the occurrence of noise.

At the same time, the portions of the bushes 5a and 5b to which bearings 7a and 7b are attached are formed as a hollow cylinder, and the bearings 7a and 7b are just fitted inside the hollow cylinder. Forming the bush having the shape of the hollow cylinder by resin molding makes it unnecessary to fabricate the fitting portion, thus this part can be inexpensive and fabrication cost of the die can be reduced at the same time. The bushes 5a and 5b are just fitted with the stator core 3 as described later while the cutout portions 13a and 13b contact the stator core. In this regard, a stator winding wire 4 is wound around each of the magnetic poles.

The bushes 5a and 5b and the stator core 3 are assembled as described later, and are contained in a housing which consists of the plate portion 1 and the ing case 2 formed in the shape of a hollow cylinder with a bottom. The output end of the rotating shaft 6 is output from a through hole 17 formed on the plate portion 1. The portion at which the plate portion 1 and the sealing case 2 contact with each other, and the portion at which the connector 8 which is disposed at the side face of the sealing case 2 and sealing case 2 contact with each other are sealed by welding and so on with a sealing material 9. Also, the connector 8 is formed by synthetic resin and so on, and the portion of the connector contacting terminals (only 12a and the 12b are shown in the figure) to which a plurality of stator winding wires are connected is sealed, for example, with an adhesive 91.

In this regard, a tongue portion, which is not shown in the figure, may be formed at the end of the sealing case 2 in the portion at which the plate portion 1 and the sealing case 2 firmly contact with each other, at the same time, a through hole may be formed on the plate portion 1 in order for the tongue portion to just fit into the through hole, thus it becomes easy for sealing work to be done with the sealing material 9 at assembly time.

Also, the through hole 17 is sealed by being firmly contacted with an assembly material to be used with the stepping motor, which is not shown in the figure, for example, an O-ring interposed between a face PP of the plate portion 1. Spacers 16 and 15, through which the rotating shaft 6 pierces, are interposed between the bearing 7a and the rotor 11a and between the bearing 7b and the rotor 11b, respectively.

The bush 5b contacts the inside of the sealing case 2, a spring shim 19 being interposed therebetween as a means for pre-load by which the bush 5b is pushed by the sealing case in the longitudinal direction of the rotating shaft 6. The spring shim 19, of which portions 19a and 19b of the outer circumference are formed as convexities, contact the inside of the sealing case 2.

At the same time, a spring shim 25 as a means for pre-load is disposed at the side of the bush 5b which faces the bearing 7b disposed in the hollow cylinder portion of the bush 5b. The spring shim 25, of which portions 25a and 25b of the outer circumference are formed as convexities, contact the bottom portion of the hollow cylinder portion of the bush 5b, a ring 14b being interposed which is penetrated by the rotating shaft 6. By the interposition of the spring shim 25, the bearing 7b is pre-loaded by the bush 5b in the longitudinal direction of the rotating shaft 6.

Also, an air gap G is provided between the side portion of the sealing case 2 and the outer circumference of the stator core. The air gap G is an air gap for positioning the cutout portions 13a and 13b formed at the bushes 5a and 5b with respect to the contacting stator core 3 in the direction perpendicular to the rotating shaft 6. Also, the air gap has a noise-reducing effect by preventing resonance caused by the propagation of the electromagnetic vibration to the sealing case, which occurs at the stator core when an electric current is flowed to the stator coil for excitation.

FIGS. 3A, 3B, 3C and 3D illustrate the structures of the bushes 5a and 5b, FIG. 3A is a view of the bush 5a taken in the direction of A of FIG. 3B, FIG. 3B is a cross-sectional view of the bush 5a, FIG. 3C is a cross-sectional view of the bush 5b, and FIG. 3D is a view of the bush 5b taken in the direction of B of FIG. 3C.

As shown in FIG. 3, the bush 5a is formed with a through hole 21a through which the rotating shaft 6 penetrates, and a hollow cylinder portion 20a into which the bearing 7a is fitted. As shown in FIG. 2, a bottom portion 34 of the hollow cylinder portion 20a is formed with an annular concavity 14a.

The outer circumference of the side of the hollow cylinder portion 20a facing the rotor 11a is formed with the cutout portion 13a which contacts the stator core 3. The cutout portion 13a is fixed by fitting the inside of the stator core 3.

The bush 5b is formed with a through hole 21b through which the rotating shaft 6 penetrates, and a hollow cylinder portion 20b into which the bearing 7b is fitted. As shown in FIG. 2, a bottom portion 33 of the hollow cylinder portion 20b is formed with an annular concavity 14b.

The side of the hollow cylinder portion 20b facing the rotor 11b is formed with the cutout portion 13b which contacts the stator core 3. The cutout portion 13b is inserted into and fixed by fitting inside of the stator core 3. As a result, the cutout portions 13a and 13b are inserted into the stator core 3, and the bushes 5a and 5b are fixed by fitting, thus a gap distance is obtained between the stator core 3 and the rotors 11a and 11b in the direction perpendicular to the rotating shaft 6.

Furthermore, the bush 5b is formed with a concavity portion 30, in which the spring shim 19 is disposed, at the end of the side opposite to the side on which the hollow cylinder portion 20b is formed, and the bush 5b is pushed by the sealing case 2 in the longitudinal direction of the rotating shaft. As a result, the accuracy in the direction along with the rotating shaft can be secured by pushing of the spring shims 25 and 19 even in the case where the fabrication precision or the assembly precision of the spacers 15 and 16, and the bearings 7a and 7b, which are interposed between the bushes 5a and 5b and the stator core 3, is low, or even in the case where the spacers 15 and 16, and the bearings 7a and 7b are worn out by the rotation of the rotating shaft FIGS. 4A, 4B and 4C illustrate an assembling process of a stepping motor of an embodiment shown in FIG. 2, FIG. 4A illustrates assembling of the bush 5b and the rotor, FIG. 4B illustrates assembling of the portion which was assembled in the above FIG. 4A and the stator core 3, and FIG. 4C illustrates assembling of the portion which was assembled in the above FIG. 4B and the bush 5a.

Figure 4A:
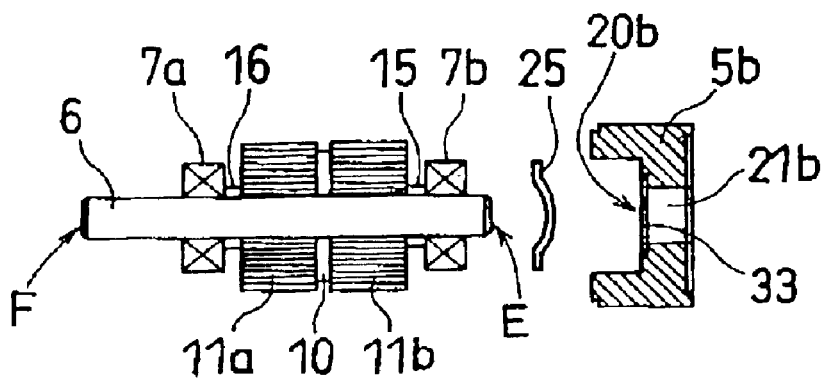
FIGS. 4A, 4B, and 4C illustrate an assembling process of the stepping motor of the embodiment shown in FIG. 2.

In FIG. 4A, the rotors 11a and 11b, with the magnet 10 interposed therebetween, are attached to the rotating shaft 6, and the bearings 7a and 7b are attached to both ends of the rotating shaft 6. At the side of the opposite end E to the output end F of the rotating shaft 6, the spring shim 25, which has a through hole not shown in the figure, is disposed at the bottom portion 33 of the hollow cylinder portion 20b of the bush 5b. The rotating shaft 6 penetrates into the through hole 21b.

Figure 4B:
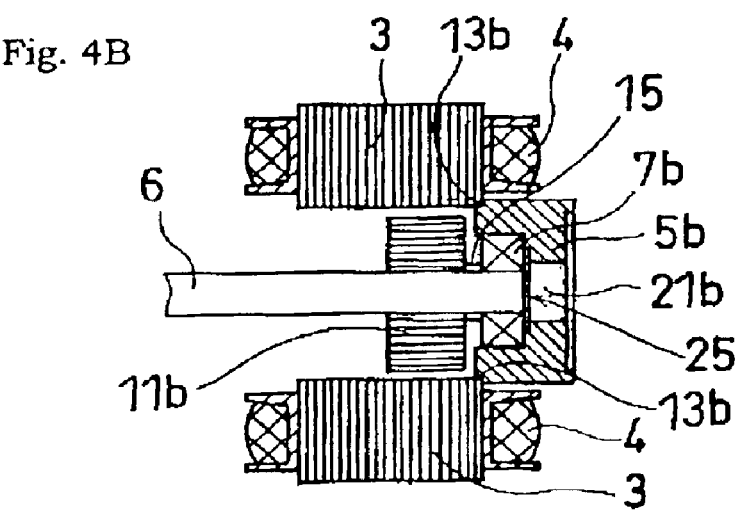

In FIG. 4B, the bush 5b, which is assembled as described above, is inserted into the stator core 3 along the inner diameter until the cutout portion 13b of the bush 5b contacts the stator core 3.

Figure 4C:
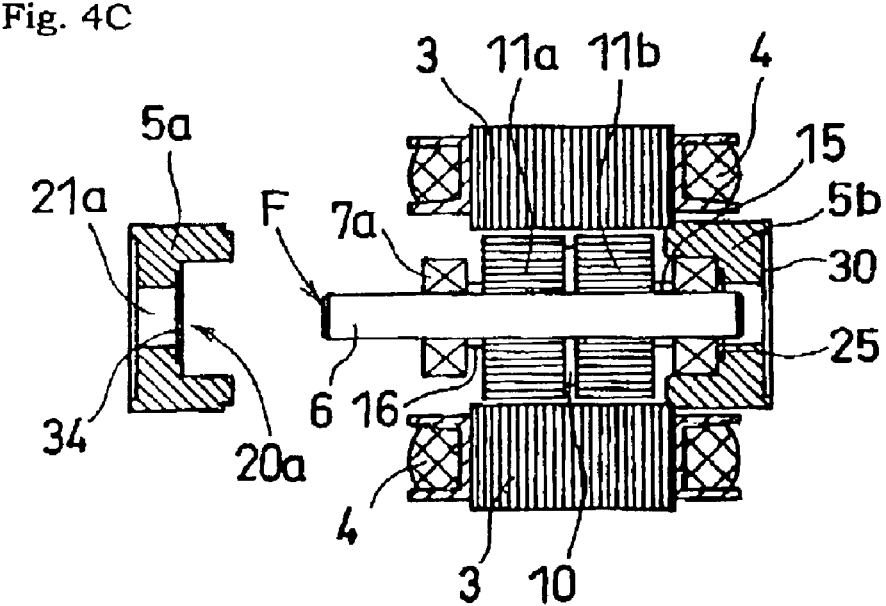

In FIG. 4C, the bush 5b and the stator core 3, which were assembled as described above, are disposed such that the bottom portion 34 of the hollow cylinder portion 20a of the bush 5a faces the side of the output end F of the rotating shaft 6, and the rotating shaft 6 penetrates the through hole 21a, thus the stepping motor is constructed.

The stepping motor, which was constructed as described above, is contained in the sealing case 2 such that the spring shim 19 is disposed at the concavity portion 30 of the bush 5b as shown in FIG. 2. Then, the opening portion of the sealing case 2 formed as a hollow cylinder with a bottom is covered by the plate portion 1, and the portion at which the plate portion contacts the sealing case 2, and the portion at which the connector 8 disposed at the side face contacts the ing case 2 are sealed with the sealing material 9, for example, by welding and so on.

Figure 5:
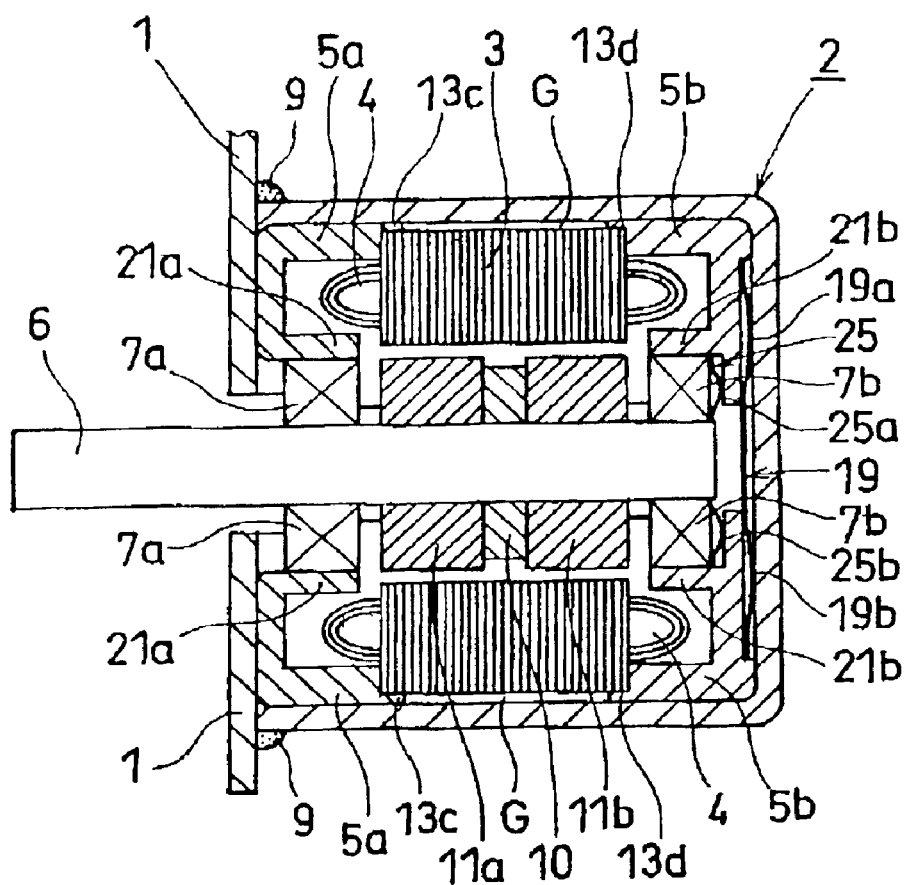
FIG. 5 is a cross-sectional view of a stepping motor of an outer-case type embodiment according to the present invention.

FIG. 5 is a cross-sectional view of a stepping motor of an outer case type embodiment according to the present invention. In the following, a description is given with reference to FIG. 5. The same reference numerals are applied to the same portions which are described in FIG. 2, and their descriptions are omitted.

The difference between FIG. 2 and FIG. 5 is that cutout portions 13c and 13d, at which the bushes 5a and 5b contact the stator core 3, are formed individually at the side of the bushes 5a and 5b where the stator core 3 faces the sealing case 2 forming the housing, holding the portion of the outer circumference of the stator core 3.

The bushes 5a and 5b contact the sealing case 2 not only at the bottom, but also at the side portion, and the air gap G is disposed between the outer circumference of the stator core 3 and the side portion of the sealing case 2 by the cutout portions 13c and 13d. The air gap G is for positioning cutout portions 13c and 13d formed at the bushes 5a and 5b with respect to the contacting stator core 3 in the direction perpendicular to the rotating shaft 6. This means that the stator core 3 is fixed by the cutout portions 13c and 13d, thus a gap distance is obtained between the stator core and the rotors 11a and 11b in the direction perpendicular to the rotating shaft 6.

What is claimed is:

1. A sealed motor, in which a stator core is disposed outside rotors attached to a rotating shaft and the rotating shaft is held by bearings attached to the rotating shaft, the motor comprising:

bushes for fixing the bearings;

a housing having a through hole from which one end of the rotating shaft protrudes as an output shaft; and pre-load means disposed inside the housing for pushing the bush in the longitudinal direction of the rotating shaft, wherein the housing comprises a plate portion and a sealing case which is formed in the shape of a hollow cylinder with a bottom, the output shaft outputs from a through hole which is formed on the plate portion, the bushes have cutout portions formed for positioning the stator core and the rotors in the direction perpendicular to the rotating shaft and for positioning the rotors in the longitudinal direction of the rotating shaft, and the plate portion and the sealing case constituting the housing are sealed by a sealing material.

2. A sealed motor according to claim 1, wherein the pre-load means is disposed at the bush which is disposed at the opposite side of the output shaft of the rotating shaft, and the pushing is performed in the direction of the rotating shaft.

3. A sealed motor according to claim 2, wherein the pre-load means is disposed between the bush and the housing, and between the bearing and the bush.

4. A sealed motor according to claim 2, wherein the pre-load means is springs which are disposed between the bush and the housing, and between the bearing and the bush.

5. A sealed motor according to claim 1, wherein the pre-load means is disposed between the bush and the housing, and between the bearing and the bush.

6. A sealed motor according to claim 1, wherein the pre-load means is springs which are disposed between the bush and the housing, and between the bearing and the bush.

7. A sealed motor according to claim 5, wherein the pre-load means is springs which are disposed between the bush and the housing, and between the bearing and the bush.

8. A sealed motor according to claim 1, wherein an air gap exists between the housing and the stator core.

9. A method of employing a sealed motor having a sealed-structure in which a stator core is disposed outside rotors attached to a rotating shaft and the rotating shaft is held by bearings attached to the rotating shaft, the motor including bushes for fixing the being and a housing having a plate portion and a sealing case formed in the shape of a hollow cylinder with a bottom, an output shaft outputting from a through hole formed on the plate portion, the bushes having cutout portions formed for positioning the stator core and the rotors in the direction perpendicular to the rotating shaft and for positioning the rotors in the longitudinal direction of the rotating shaft, and pre-load means being disposed inside the housing for pushing the bush in the direction of the rotating shaft, the method comprising the steps of:

building the motor in the housing;

sealing the plate portion and the sealing case by a sealing material; and sealing the through hole formed on the plate portion by contacting firmly with a build-up material for which the motor is used.

* * * * *